United States Patent [19]

Smith et al.

[11] 3,742,596

[45] July 3, 1973

[54] APPARATUS AND METHOD FOR FORMING SHAPED INSULATORS AND FOR DEVELOPING COILS AND FOR INSERTING INSULATORS AND COILS INTO A MAGNETIC CORE

[75] Inventors: Dallas F. Smith; Richard B. Arnold, both of Fort Wayne, Ind.

[73] Assignee: General Electric Company, Fort Wayne, Ind.

[22] Filed: Mar. 1, 1971

[21] Appl. No.: 119,618

[52] U.S. Cl. .............. 29/596, 29/205 R, 29/205 E, 29/605, 29/606, 140/92.1
[51] Int. Cl. ........................................ H02k 15/00
[58] Field of Search.................. 29/596, 605, 606, 29/205 R, 205 E; 140/92.1

[56] References Cited
UNITED STATES PATENTS

| | | | |
|---|---|---|---|
| 3,579,818 | 5/1971 | Arnold et al. | 29/596 |
| 3,625,261 | 12/1971 | Hill et al. | 140/92.1 |
| 3,579,791 | 5/1971 | Arnold | 29/205 R |
| 3,626,432 | 12/1971 | Fohl et al. | 29/205 R |
| 3,624,891 | 12/1971 | Droll | 29/205 R |
| 3,636,613 | 1/1972 | Droll | 29/205 R |
| 3,557,432 | 1/1971 | Pavesi | 29/205 R |
| 3,514,836 | 6/1970 | Mason | 29/205 E |

FOREIGN PATENTS OR APPLICATIONS 1,223,090  2/1971  Great Britain

OTHER PUBLICATIONS

Willy Aumann, Advertisement for SELEKTASERT 930

Primary Examiner—Charles W. Lanham
Assistant Examiner—Carl E. Hall
Attorney—John M. Stoudt, Radford M. Reams, Ralph E. Krisher, Jr., Joseph B. Forman, Frank L. Neuhauser and Oscar B. Waddell

[57] ABSTRACT

Method and apparatus for forming shaped insulators and for developing coil turns into coil groups and inserting the insulators and coils into preselected slots of a magnetic core. The insulators are automatically formed at an insulator-forming station by an assembly including control mechanism for providing a series of insulators corresponding to predetermined slots of the core. Coil turns for the coil groups are generated about a coil turn-forming assembly of a winding head mechanism at a turn-forming station. Insulator and coil insertion tooling is movable between the insulator-forming station, to receive formed insulators; the turn-forming station, to receive coil turns; and an insertion station, at which insulators and coil turns are inserted from the insertion tooling into the magnetic core.

The insulator and coil insertion tooling is mounted for pivotal movement about a horizontal axis so that it swings through a generally vertical plane. The insulator-forming station, the turn-forming station and the insertion station intersect this plane. The turn-forming assembly and the tooling are aligned during coil turn generation and some previously generated turns are received in the tooling as other turns are generated. Also the tooling is rotatable, relative to the coil turn-forming assembly, so that turns for each electric phase may be received in the tooling angularly displaced from other phases.

Additionally the apparatus has two winding head mechanisms for easily generating turns for two phases from different wire.

Furthermore the insulator-forming control mechanisms can be set so that the insulator-forming assembly will provide insulators in predetermined series which correspond to different series of slots of the magnetic core.

19 Claims, 21 Drawing Figures

PATENTED JUL 3 1973 3,742,596
SHEET 1 OF 8
FIG.1
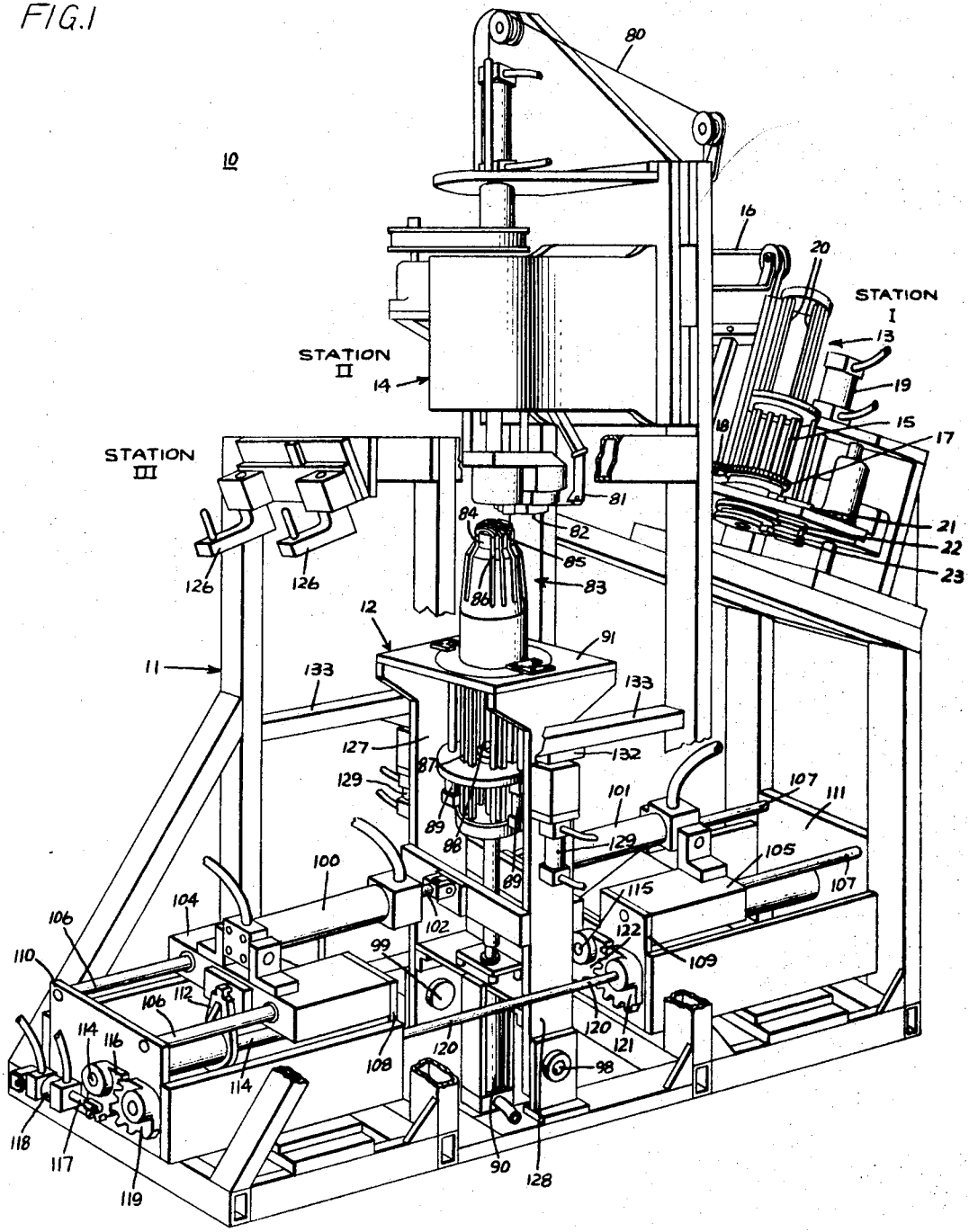
INVENTORS:
Dallas F. Smith,
Richard B. Arnold,
BY 
Attorney.

INVENTORS:
Dallas F. Smith,
Richard B. Arnold,
BY
Attorney.

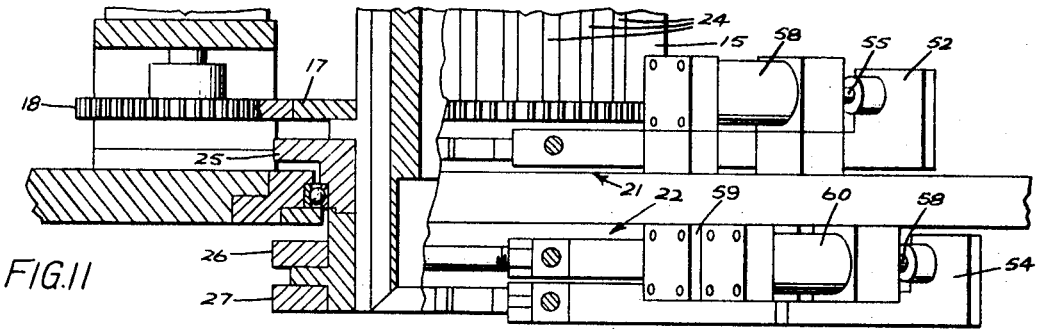
FIG.11
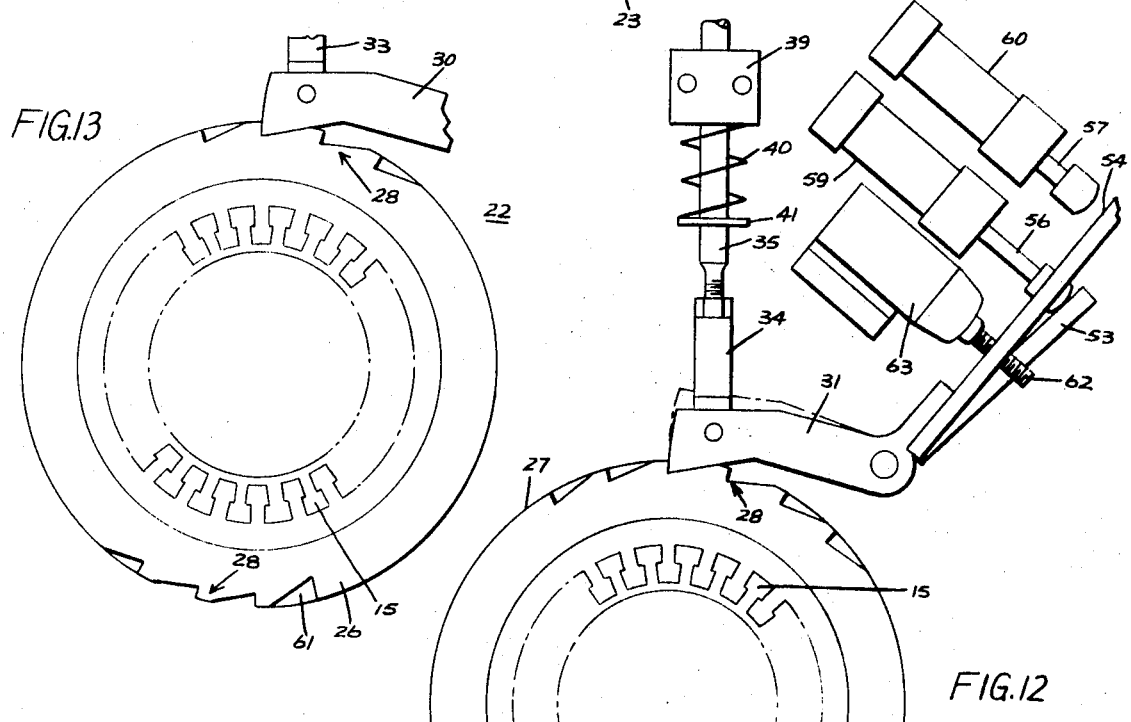
FIG.13
FIG.12
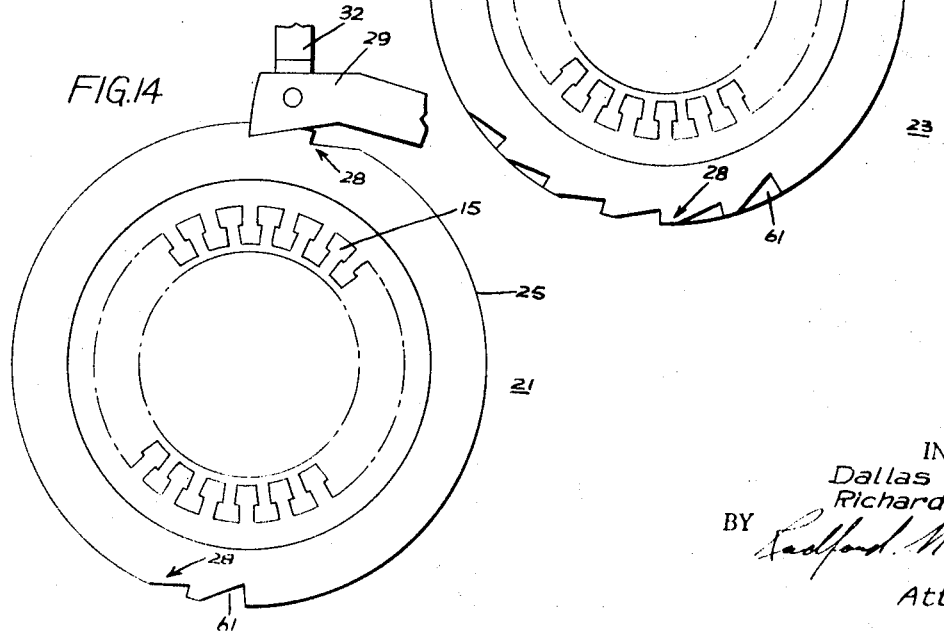
FIG.14
INVENTORS:
Dallas F. Smith,
Richard B. Arnold,
BY
Attorney.

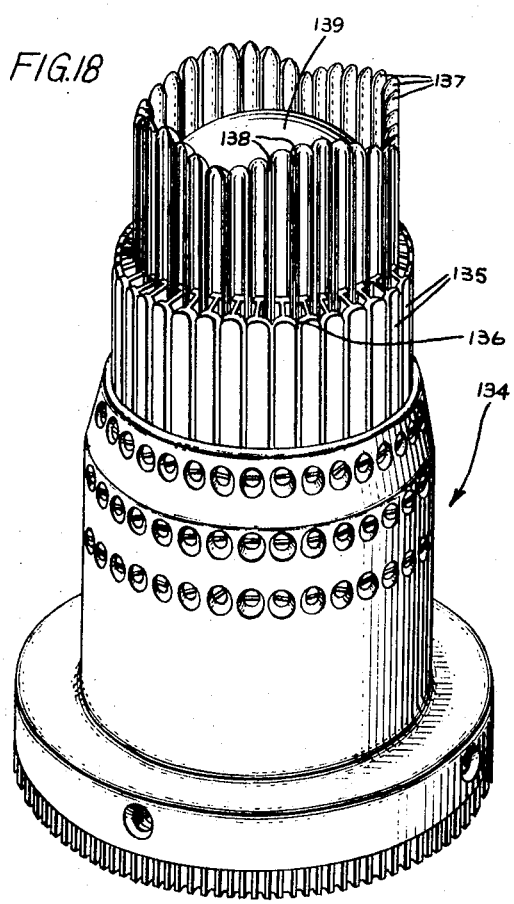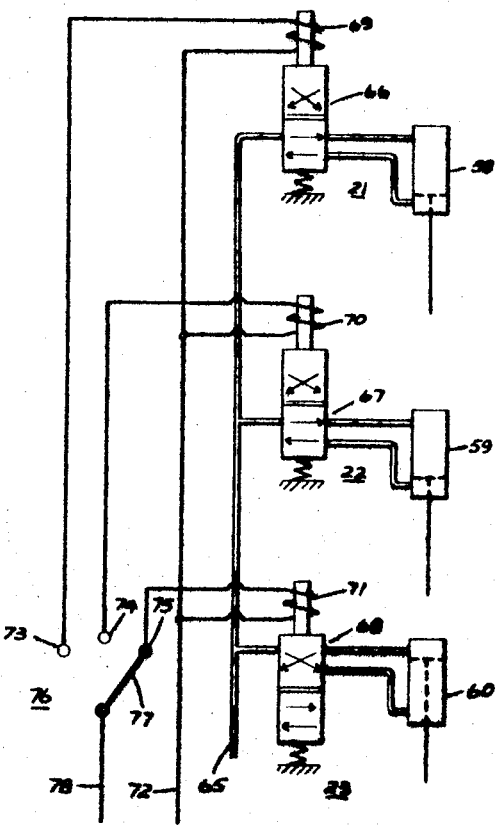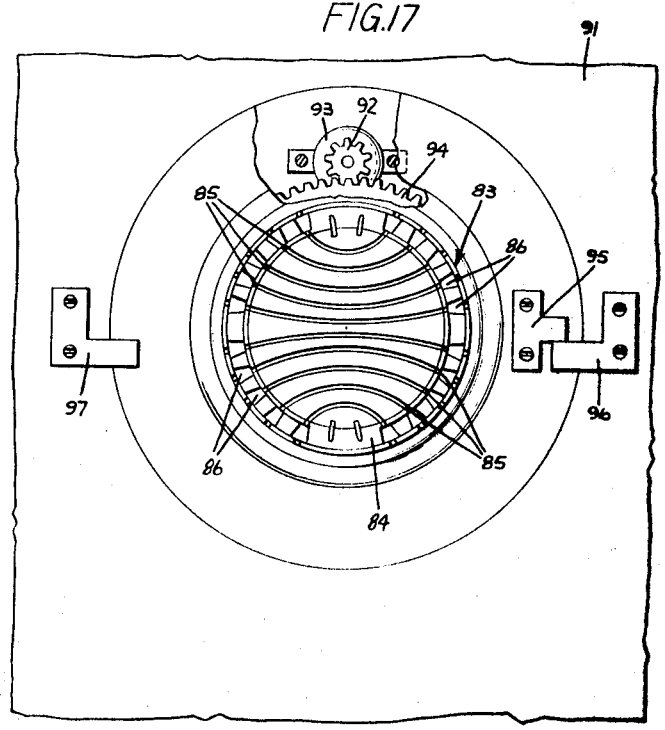

INVENTORS:
Dallas F. Smith,
Richard B. Arnold,
BY
Attorney.

APPARATUS AND METHOD FOR FORMING SHAPED INSULATORS AND FOR DEVELOPING COILS AND FOR INSERTING INSULATORS AND COILS INTO A MAGNETIC CORE

CROSS REFERENCE TO RELATED COPENDING APPLICATIONS

The following copending applications (and patents which issued from applications copending herewith), assigned to the same assignee as the present invention, are expressly incorporated by reference in the present application: Method And Apparatus For Forming Shaped Insulators And For Developing Coils Of A Magnetic Core, Richard B. Arnold and Dallas F. Smith, U.S. Pat. No. 3,579,818, issued May 25, 1971; Apparatus For Inserting Insulators And Coil Turns Into The Slots Of A Magnetic Core, Richard B. Arnold, Ser. No. 101,638 filed Dec. 28, 1970; Coil Developing Apparatus, Richard B. Arnold, U.S. Pat. No. 3,579,791 issued May 25, 1971; Coil Developing Apparatus, Richard B. Arnold, U.S. Pat. No. 3,672,027, issued June 27, 1972; and Method Of Developing Coils Of A Coil Group For A Magnetic Core, Richard B. Arnold, U.S. Pat. No. 3,672,040, issued June 27, 1972.

BACKGROUND OF THE INVENTION

The present invention relates to improved apparatus and methods for forming insulators and developing coils for an electromagnetic device and for inserting the insulators and coils into predetermined slots of a magnetic core.

It is an object of the present invention to provide new and improved methods and apparatus for forming insulators and developing coils for an electromagnetic device and for inserting insulators and coils into predetermined slots of a magnetic core.

A further, more specific, object is to provide such improved method and apparatus in which the insulator and coil injection tooling swings through a vertical plane between an insulator-forming station, a turn-forming station and an insertion station.

Still another object is to provide an improved method and apparatus for developing a number of coils for an electromagnetic device and for inserting the developed coils in various predetermined slots of a magnetic core.

Yet another, more specific, object is to provide such an improved method and apparatus for developing and inserting coils of different sizes of wire.

Still another object of the present invention is to provide improved method and apparatus for forming a series of insulators for insertion into selected slots of a slotted magnetic core.

A further, more specific, object of the invention is to provide such an improved insulator-forming method and apparatus which selectively will provide different series of insulators.

SUMMARY OF THE INVENTION

In carrying out the objects, in one form of our invention, there is provided a new and improved method and apparatus for forming insulators and developing coils for electromagnetic devices and for inserting insulators and coils into predetermined slots of a magnetic core. The apparatus includes insulator and coil insertion tooling to receive insulators and coils and subsequently effect insertion of the received insulators and coils into predetermined slots of a magnetic core. The apparatus further includes a first station having insulator-forming means; a second station having turn generation means; and a third station at which insulators and coils previously received in the tooling are inserted into the core. There is means for moving the insulator and coil insertion tooling between the first, second and third stations, with the tooling being disposed at an angle to the vertical when it is at at least one of the stations. In one exemplification of the invention the tooling is pivoted about a horizontal axis to swing through a generally vertical plane and the first, second and third stations intersect that plane. The tooling moves along a path lying in the generally vertical plane and the various stations are also located along such path.

The insulator and coil insertion tooling includes means defining spaced apart slots to receive generated turns to develop the coils for at least a coil group. Means is included for rotating the tooling to bring different slots into alignment with the turn-generating means and to insert the received insulators and coils in predetermined slots of a magnetic core. The tooling is adapted to receive turns of different size wire, and the apparatus is adapted to receive coils for a number of phases and insert the coils in the slots of a magnetic core either serially or simultaneously.

The insulator-forming means includes an insulator-receiving mechanism having slots corresponding to the slots of a slotted magnetic core and severing means operable to cyclically sever a length from a strip of insulative material and introduce the severed length into a slot of the insulator-receiving mechanism. There is a drive means for moving the insulator-receiving mechanism to bring the slots of the mechanism sequentially in alignment with the severing means. There also are at least first and second control mechanisms, with each control mechanism being effective when operative to repeatedly halt the insulator-receiving mechanism with a corresponding series of insulator-receiving slots in alignment with the severing means. The series of slots related to at least one of the control mechanisms is different than the series of insulator-receiving slots related to the other of the control mechanisms. There is selector means effective to determine which of the control mechanisms is operative at any given time.

BRIEF DESCRIPTION OF THE DRAWINGS

The subject matter which we regard as our invention is particularly pointed out and distinctly claimed in the concluding portion of the specification. The invention itself, however, together with further objects and advantages thereof may be better understood by reference to the following description taken in conjunction with the accompanying drawings in which like numerals identify like components, and in which:

FIG. 1 is a perspective view of an apparatus for forming shaped insulators, for developing coil turns into coil groups and for inserting insulators and coils into slots of a magnetic core embodying one form of the present invention, the view being somewhat schematic in form and with certain parts omitted for purposes of illustration;

FIG. 11 is a somewhat schematic partial side view, partly in section, illustrating certain components of an insulator-forming apparatus according to one aspect of the present invention;

FIG. 12 is a partial bottom view of the apparatus of FIG. 11, illustrating certain features of one control mechanism;

FIG. 13 is a view similar to FIG. 12 but illustrating certain features of another control mechanism included in the insulator-forming apparatus;

FIG. 14 is a view similar to FIG. 12 but illustrating certain features of yet another control mechanism included in the insulator-forming apparatus;

FIG. 16 is a schematic diagram of a hydraulic circuit for selectively activating the control mechanisms of FIGS. 12–15;

FIG. 17 is a fragmentary plan view of the insertion tooling used in the mechanism illustrated in FIG. 1;

FIG. 18 is a partial perspective view of another form of insertion tooling useful in the present invention;

DESCRIPTION OF THE PREFERRED EMBODIMENTS

Figure 2:
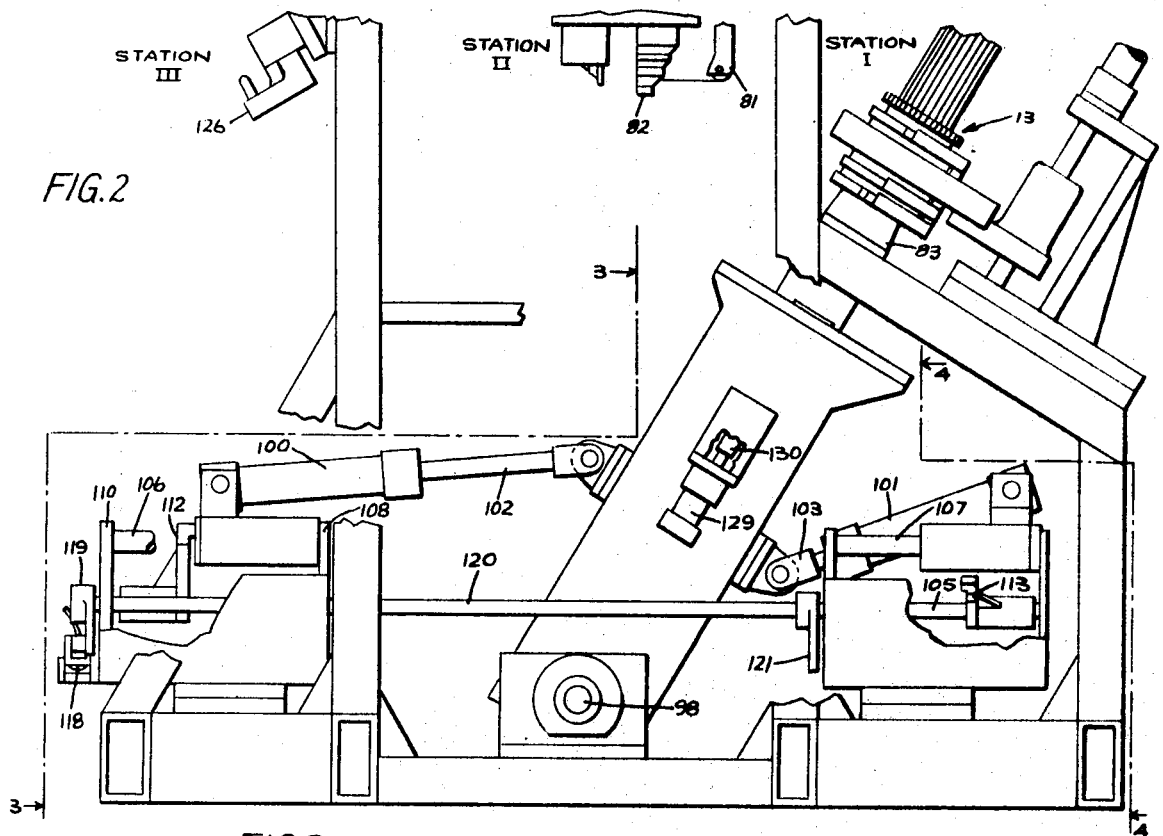
FIG. 2 is a side elevational view of the apparatus of FIG. 1, but with the insulator and coil insertion tooling in another position, the view being somewhat schematic in form and with certain parts omitted for purposes of illustration.
Figure 3:
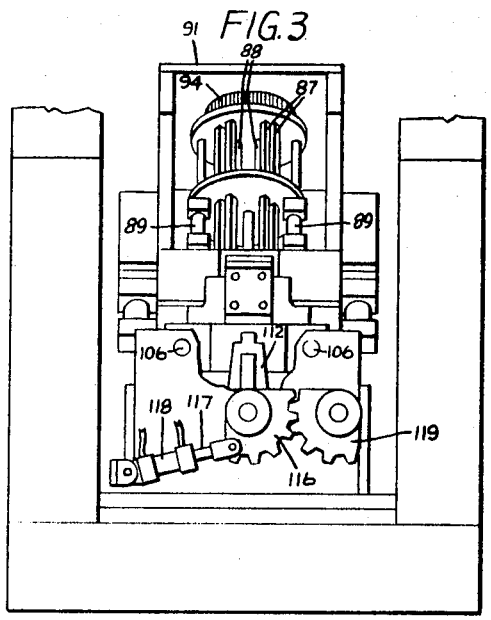
FIG. 3 is a view generally as seen along line 3—3 in FIG. 2.
Figure 4:
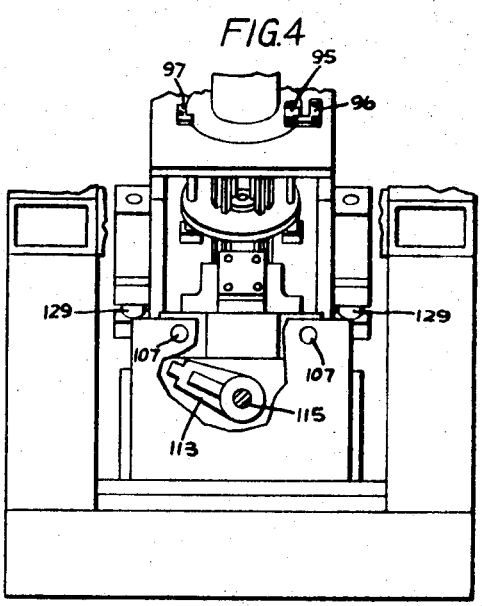
FIG. 4 is a view generally as seen along line 4—4 in FIG. 2.

Referring now to the drawings, and particularly to FIGS. 1–10, there is illustrated a new and improved apparatus for forming shaped insulators, for developing coil turns of electrically conductive wire into coil groups and for inserting insulators and coils into predetermined slots of magnetic cores. The drawings are somewhat schematic in form and some parts have been omitted for purposes of illustration. One advantage of the present invention is that a number of proven components may be utilized in a highly effective manner. Thus some of the components of the overall apparatus 10 are well-known. The apparatus includes a frame generally indicated at 11 which conveniently may be constructed of hollow metal members and serves as a support for various operative components of the apparatus. The insulator and coil insertion apparatus includes insulator and coil insertion tooling generally indicated at 12 for receiving insulators and coils therein and subsequently effecting insertion of the received insulators and coils into predetermined slots of a magnetic core. The tooling 12 is movable between Station I which includes insulator-forming means 13 for forming insulators in a predetermined pattern; Station II includes turn-generating means 14 for generating turns of electrically conductive wire; and Station III at which insulators and coils previously received in the insertion tooling 12 are inserted into a magnetic core.

The illustrated insulator-forming means 13 at Station I may conveniently be of the general type shown and described in the aforementioned application Ser. No. 806,057. Such a means includes a magazine 15 having a plurality of slots therein to receive insulators of predetermined lengths which have been severed from a continuous strip 16 of insulating material such as polyethylene terephthalate, paper, or the like, in a predetermined selected series.

The magazine is connected to a geared wheel 17 which is selectively driven from a powered gear 18 for rotating the magazine 15 to move various slots of the magazine 15 into position to receive insulators. The insulator-forming means 13 also includes a power means 19, in the form of a hydraulic cylinder in the exemplification, for moving the magazine 15 and its associated components axially relative to the insertion tooling 12 to place the magazine in position for inserting previously formed insulators from the magazine into the insulator and coil insertion tooling 12. The insulator-forming means 13 also includes a number of rods or pushers 20 which are axially movable relative to the magazine for transferring formed insulators from the magazine into the insulator and coil insertion tooling 12. Control mechanisms 21, 22 and 23 are also included in the insulator-forming means 13 to selectively control the rotation of the magazine for presenting different predetermined series of the slots of the magazine to receive insulators for selectively varying the pattern of insulators.

Generally as indicated in FIG. 11, the magazine 15 is rotated by gear 18 through gear wheel 17 to bring various insulator-receiving slots 24 into alignment with a severing means (such as that shown and described in the aforementioned U.S. Pat. No. 3,579,818). The severing means is operable to cyclically sever a length from the strip 16 of insulation material and introduce the severed length into an appropriate slot in the insulator-receiving mechanism or magazine 15. The control mechanisms 21, 22 and 23 are effective, when operative, to repeatedly halt the magazine with a corresponding series of insulator-receiving slots 24 in alignment with the severing means. The control mechanisms 21–23 include plates 25, 26 and 27 respectively which are mounted to the magazine 15 in an axially stacked manner and are connected to the magazine to rotate therewith. Each of the plates is provided with a series of openings 28, with each of the plates having two such series located on angularly opposite sides of the plates, in the illustrated exemplification. With such series the magazine is repeatedly stopped to provide insulators in magazine slots 24 which correspond to positions for insulators in a stator for a two pole electric motor. It will be understood that the series of recesses 28 may be provided in other arrangements so as to distribute insulators in the magazine 15 in patterns which are suitable for other forms of motors. Comparing FIGS. 12–14 it will be seen that each series of recesses 28 in plate 25 includes two recesses while the series in plate 13 includes four recesses each and the series in plate 27 includes six recesses each. Thus, when control mechanism 21 is operative there will be provided a total of four insulators, while control mechanism 22 being operative will provide a total of eight insulators and control mechanism 23 being operative will provide a total of twelve insulators. When the insulator-forming means 13 is energized the gear 18, acting through the geared wheel 17, tends to continuously rotate the magazine 15; however, the recesses 28 of the operative control mechanism cooperate with a corresponding dog 29, 30 and 31 respectively to repeatedly stop the magazine at positions corresponding to each of the selected recesses to align a corresponding slot in the magazine with the severing means. Each of the dogs 29–31 is connected to an actuator 32, 33 and 34 respectively. Each of the actuators is connected by one of the elongated rods 35 to a slide block 36, 37 and 38 respectively. Each of the rods 35 extends through a guide block 39 and is biased to a position engaging its associated dog with a recess in the corresponding plate by means of spring 40, which is positioned between a guide block 39 and a washer 41 mounted to that rod.

Figure 15:
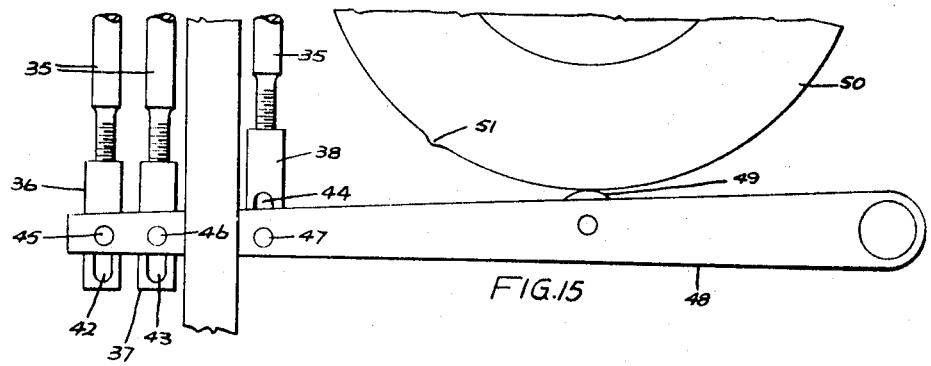
FIG. 15 is a fragmentary elevational view illustrating other components of the insulator-forming apparatus.

As seen in FIG. 15, each of the slide blocks 36–38 is provided with an elongated slot 42, 43 and 44 respectively. The slots receive one of the pins 45, 46 and 47 which is mounted in a pivoted arm 48. The arm 48 also carries a roller 49 which bears against a rotatable cam 50 having an extension 51. Generally as described in the aforementioned U.S. Pat. No. 3,579,818, as the cam 50 rotates the extension 51 engages the roller 49 and pivots the arm 48 so that the pins move against the bottom of the slots 42–44 (as seen in FIG. 15). This momentarily moves the slide blocks 36–38 downwardly (as seen in FIG. 15). Viewing FIGS. 12–14, this momentary movement of the slide blocks 36–38 momentarily lifts the dogs 29–31 out of the recesses in the associated plates so that the plates, and thus the magazine 15, are free for rotation by the gear 18. Since the arm 48 is moved by the cam only momentarily, the dogs are quickly released and are biased by their associated springs 40 to enter the next recess in their associated plate.

In order that only a selected one of the dogs 29–31 will be effective during the making of a set of insulators, each of the dogs is mounted to an actuating arm 52, 53 and 54 respectively. Each of these arms is positioned to be engaged by a plunger 55, 56 and 57 of a hydraulic cylinder 58, 59 and 60 respectively. When an individual actuating arm 52–54 is engaged by the associated plunger 55–57 the corresponding dog is held out of engagement with the associated plate 25–27 and the associated slide block 36–38 is held in its downward position (as seen in FIG. 15) so that movement of the arm 48 will not effect that dog. From FIGS. 11–15 it will be seen that the cylinders 58–60 are illustrated as set so that the control mechanism 23, including dog 31 and plate 27, is effective to determine the pattern of insulators.

It will be seen that each of the plates 25–27 has one recess 61 which is deeper than the remaining recesses. Assuming the control mechanism including that plate is effective for controlling the insulation pattern, when the associated dog is received in the recess 61, a set screw 62, carried by the associated actuating arm, engages a micro switch 63. This is effective to de-energize the insulation forming mechanism.

Referring to FIG. 16 there is shown in schematic form a selection means for determining which of the control mechanisms is effective at any given time. A hydraulic supply line 65 is connected to a suitable source of hydraulic pressure (not shown) and is connected to each of the hydraulic cylinders 58–60 through two-way valves 66–68 respectively. Each of the valves 68 includes a solenoid actuator represented by the coils 69–71 respectively with one side of each coil being connected to an electrical supply conductor 72. The other side of each of the coils 69–71 is connected to one of the stationary contacts 73, 74 and 75 respectively of a selector switch 76 which also has a movable contact 77 connected to another electrical supply conductor 78. With the switch in the position shown, only coil 71 is connected to the electrical supply and the two-way valve 68 is in the opposite position than the valves 66 and 67. Thus the hydraulic cylinder 60 is in the opposite position than the other two hydraulic cylinders to make control mechanism 23 effective for determining the insulation pattern. When it is desired to have control mechanism 22 effective to determine the insulator pattern, movable contact 77 is engaged with stationary contact 74 and, in a similar manner, when control mechanism 21 is to determine the insulator pattern the movable contact 77 is engaged with stationary contact 73.

Referring again to FIG. 1, the turn-generating means 14 conveniently may be such as that shown and described in the aforementioned U.S. Pat. No. 3,672,027, in which wire 80 is fed to a flyer 81 from which it is wound about a stepped, noncollapsing winding head or form 82. Details of the various components of this turn-generating means are fully disclosed in U.S. Pat. No. 3,672,027 and will not be repeated herein. It will be understood that, assuming that the insulator and coil insertion tooling 12 is positioned in alignment with the winding head 82, turns of wire for the predetermined coils will be generated about the winding head and will be moved from the winding head into the injection tooling.

The coil and turn injection tooling illustrated in FIGS. 1–10 and FIG. 17 may be basically the same as that shown and described in application Ser. No. 101,638 for example. Such tooling includes a head 83 with a divider blade section 84 and coil turn feeder blades 85 mounted therein. As is described in the aforementioned application Ser. No. 101,638, there are slots between the divider blade section and each of the coil turn feeder blades to receive the turns for the coils. The coil turn feeder blades form a turn pusher device for inserting the coils into a slotted structure such as a magnetic core. The head 83 also includes a number of slots 86 to receive insulators from the insulator-forming means 13. The insulator and coil insertion tooling 12 also includes insulator pushers 87 and actuator rods 88 for effecting insertion of previously received insulators and coils from the tooling into a suitable magnetic core. The insulator pushers 87 and actuator rods 88 may be moved by any suitable power means such as the hydraulic cylinders 89 and 90, by way of illustration.

As best seen in FIG. 17, the head 83 is rotatably mounted on plate 91. Head 83 is rotated by a gear 92 which is driven by hydraulic motor 93 and meshes with gear teeth 94 formed integrally with the head 83. A tab or finger 95 is mounted on the head to selectively engage a pair of stops 96 and 97 which are mounted on the plate 91 on angularly opposite sides of the head 83. Thus, when the gear 92 drives the head 83 in a clockwise direction (as seen in FIG. 17) the tab 95 comes into contact with the stop 96 to position the head as shown in FIG. 17. On the other hand, when the gear 92 drives the head in the opposite or counterclockwise direction the tab 95 comes into engagement with the stop 97 to position the head in an orientation which is rotated 180° from that shown in FIG. 17. It will be understood that the two stop positioning arrangement is illustrated since the head 83 is formed to receive and then insert into a magnetic core insulators and coils for a two pole motor.

It will be understood that the drive and stop mechanism is provided to rotate the insulator and coil insertion tooling relative to the insulator-forming means and the turn-generating means to position appropriate slots in alignment with these means for receiving the insulators and coils in the tooling in the proper orientation for insertion into a particular magnetic core. Thus when the coil and turn injection tooling used is designed with other slot arrangements, such as those suitable for use with a four pole or six pole motor stator, for instance, the drive and stop mechanism will be suitably modified to provide the appropriate tooling rotation.

Figure 5:
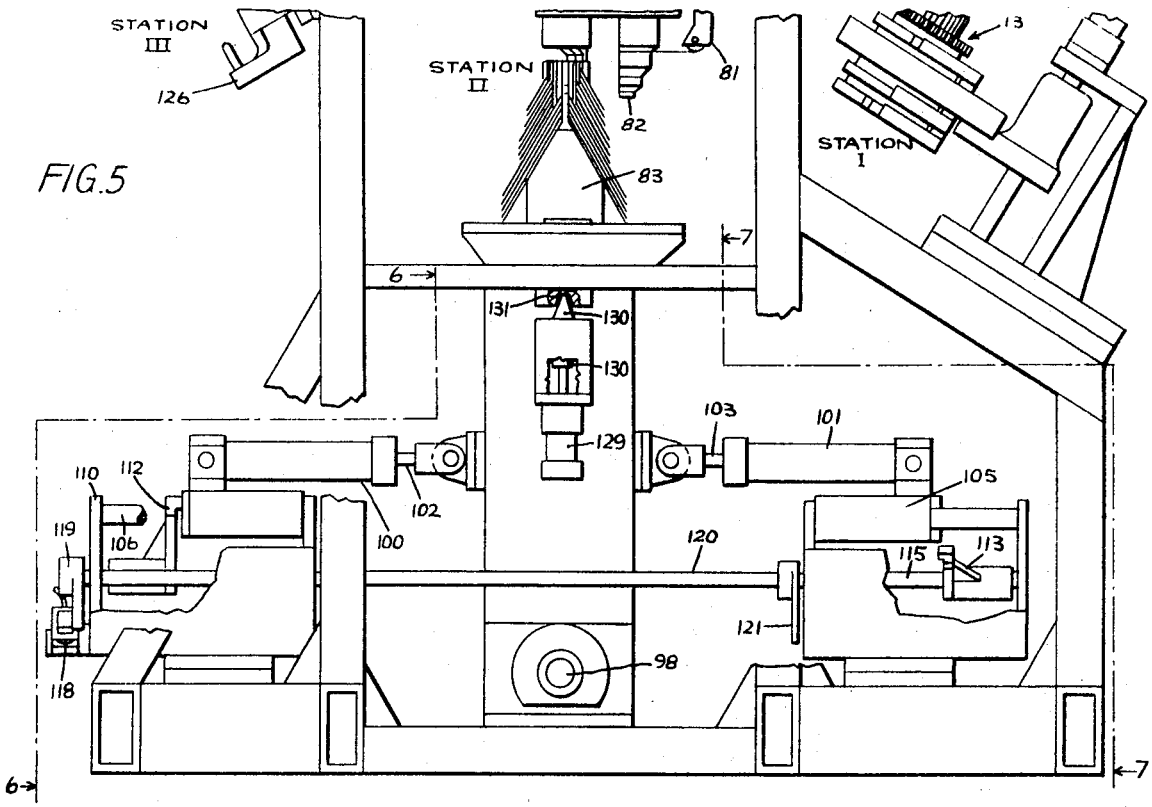
FIG. 5 is a side elevational view similar to FIG. 2, but showing the insulator and coil insertion tooling in the position of FIG. 1.
Figure 6:
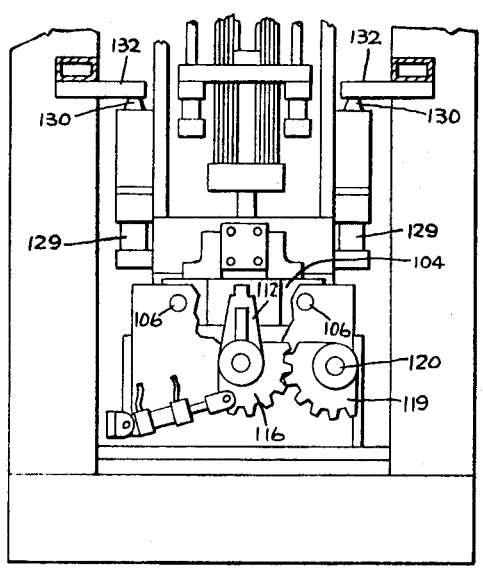
FIG. 6 is a view generally as seen along line 6—6 in FIG. 5.
Figure 7:
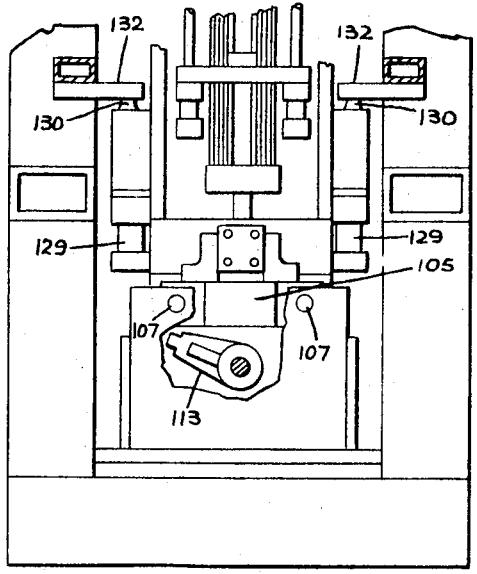
FIG. 7 is a view generally as seen along line 7—7 in FIG. 5.
Figure 8:
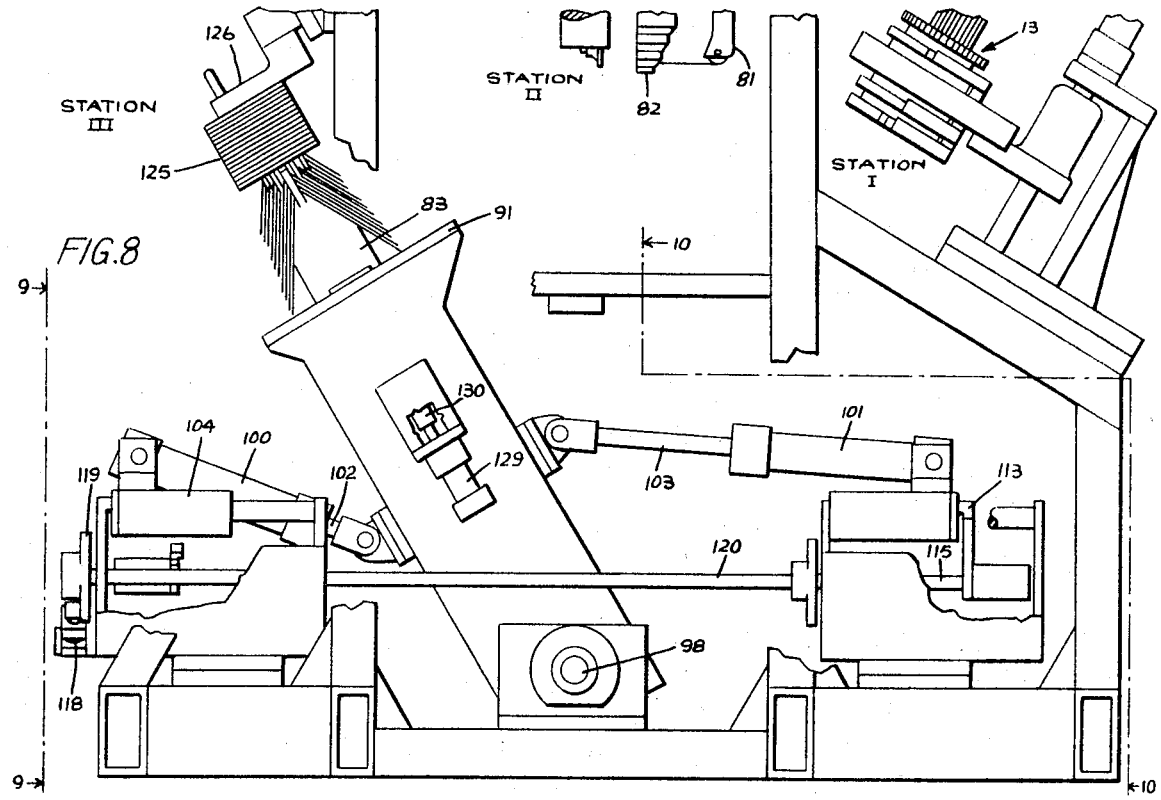
FIG. 8 is a side elevational view similar to FIG. 2, but showing the insulator and coil insertion tooling in yet another position.
Figure 9:
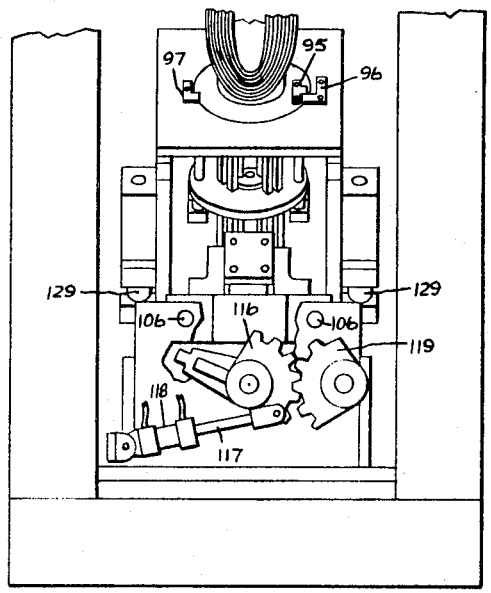
FIG. 9 is a view generally as seen along line 9—9 in FIG. 8.
Figure 10:
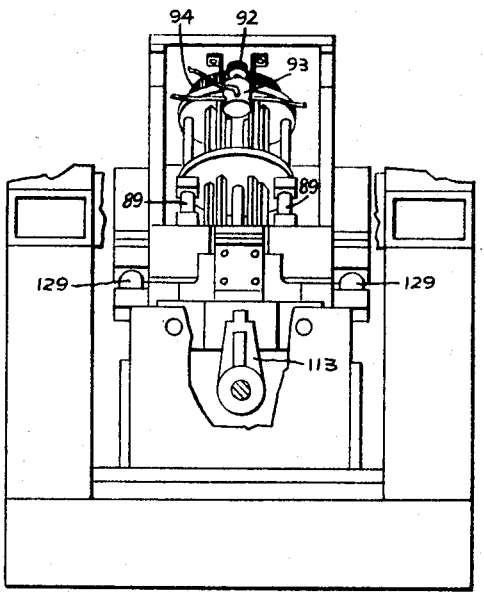
FIG. 10 is a view generally as seen along line 10—10 in FIG. 8.

The apparatus is utilized in order to form suitable insulators in an appropriate pattern, insert them into appropriate slots in the insulator and coil insertion tooling, to generate turns for the desired coils and receive the generated turns in appropriate slots in the insulator and coil inserting tooling and then to insert the previously received insulators and coils from the inserting tooling into a magnetic core. Assuming coils and insulators have been inserted from the tooling into a core and the core has been removed from the winding head 83, the insertion tooling is first moved to Station I to receive insulators which previously have been formed in the desired pattern. This position is shown in FIG. 2. Then the tooling is moved to station II for the generation of turns and receipt of those turns into the tooling. This is illustrated in FIG. 5. Then the tooling is moved to Station III where a suitable magnetic core is placed on the head 83 and the previously received turns and coils are inserted into the core. This is illustrated in FIG. 8.

As the insertion tooling is moved between Stations I, II and III, it swings through a generally vertical plane with the insulator-forming means and the turn-generating means intersecting this plane. To this end the plate 91, on which head 83 is rotatably mounted, is pivotally mounted to the frame by trunnions 98 and 99. The trunnions are positioned so that the insulator and coil insertion tooling pivot about a horizontal axis between the various stations. The tooling is moved between the stations by a pair of hydraulic cylinders 100 and 101. The piston 102 for cylinder 100 is connected to the one side of the insertion tooling 12 while the piston 103 for cylinder 101 is connected to the other side of the insertion tooling. The cylinder 101 is pivotally mounted to a guide block mechanism 104 which, in turn, is slidably mounted on a pair of guide rods or rails 106. The hydraulic cylinder 103 is pivotally mounted to a similar guide block mechanism 105 which is mounted on a set of guide rods or rails 107. At the inner end of their travel, the guide block mechanisms 104 and 105 engage and are stopped by plates 108 and 109 respectively, which form part of the frame 11. At their outer extremity of travel the guide blocks engage and are stopped by plates 110 and 111 respectively, which also form part of the frame 11.

In order to positively restrain the guide blocks and thus the hydraulic cylinders from moving from their inner position to their outer position there is provided a pair of rotatable stops 112 and 113 respectively. The stop 112 is mounted on a shaft 114 for rotation therewith and the shaft 141 is rotatably mounted between the plates 108 and 110. Similarly the stop 113 is mounted on a shaft 115 for rotation therewith and the shaft 115 is rotatably mounted between plates 109 and 111. The shaft 114 extends through the plate 110 and a sector gear 116 is securely mounted to its outer end. The sector gear is connected to the piston 117 of a hydraulic cylinder 118 so that as the cylinder is actuated and moves the piston back and forth, the piston causes rotation of the sector gear and thus shaft 114 and stop 112. Sector gear 116 intermeshes with another sector gear 119, which is mounted for rotation with a shaft 120 that extends from the outside of plate 110 through plates 108 and 109. Adjacent plate 109 another sector gear 121 is mounted on shaft 120 for rotation therewith. The sector gear 121 meshes with an additional sector gear 122 which is mounted for rotation with shaft 115. With this arrangement, when the hydraulic cylinder 118 is actuated, so as to move its piston in one direction or the other, both the stops 112 and 113 are rotated in the same direction. As will be seen by viewing FIGS. 6 and 7 and stops 112 and 113 are angularly offset with respect to each other so that when stop 112 is in the position shown in FIG. 1, preventing movement of guide block mechanism 104 toward plate 110, stop 113 is pivoted out of an interfering relationship with guide block mechanism 105 so that it is free to move toward plate 111. Conversely when stop 113 is up (as viewed in the FIGURES) to be in an interfering relationship with guide block mechanism 105, preventing its movement toward plate 111, stop 112 is out of interfering relationship with guide block mechanism 104 so that it is free to move toward plate 110.

Viewing FIGS. 1 and 5 in which the insulator and coil insertion tooling 12 is at Station II, in alignment with turn-generating means 14, and assuming it is desired to move the tooling to Station I where it is in alignment with the insulator-forming means (as seen in FIG. 2), hydraulic cylinder 100 is energized to extend piston 102. This causes the insertion tooling 12 to pivot about the trunnions 98 and 99 until the tooling comes into alignment with the insulator-forming means. At this time the hydraulic piston 101 has collapsed downwardly and guide block mechanism 105 engages plate 111 to positively stop movement of the insertion tooling. During this movement stop 112 is in interfering relationship with guide block mechanism 104 to provide a firm base from which cylinder 101 can act. This positively positions head 83 in proper alignment with the magazine 15.

After predetermined numbers of insulators in a selected pattern have been inserted into the tooling from the insulation forming means the tooling is pivoted from the position of FIG. 2 (Station I) to the position of FIGS. 1 and 5 (Station II) at which the tooling head 83 is aligned with the winding head or form 82. To accomplish this the hydraulic cylinder 100 is actuated in the reverse direction to retract piston 102. During this movement engagement of guide block mechanism 104 with plate 108 provides a stable base from which the hydraulic piston 100 operates.

While the tooling head 83 is aligned with the winding head 82, a predetermined number of turns are generated about winding head 82 and are received in appropriate slots in the head 83. It will be understood that, after some turns are generated and received, to form coils for one pole the head 83 may be rotated to dispose other of its slots in alignment with winding head 82 to form coils for another pole or poles.

Then the insulator and coil insertion tooling is moved from the position of FIGS. 1 and 5 (Station II) to that of FIG. 8 (Station III). First the hydraulic cylinder 118 is actuated to retract piston 117 and thus change the positions of stops 112 and 113 so that 112 is in a noninterfering relationship with guide block mechanism 104 and stop 113 is in an interfering relationship with guide block mechanism 105. Then hydraulic cylinder 101 is energized to extend piston 103. This pivots the insulator and coil insertion tooling about the trunnions 98 and 99 causing the guide block mechanism 104 to slide along the rails 106 until it engages plate 110 and the cylinder 100 to pivot downwardly until it engages the guide block mechanism 104. At this time the insertion tooling is positively stopped in the position shown in FIG. 8, that is at Station III. At this time, in normal operation, the insulators and coils having been positioned in the appropriate slots of the insertion tooling, a magnetic core such as that shown at 125 is placed over the divider blade section 84 and a pair of stops 126 are manually pivoted over the top of the core to hold the core on the tooling. Then the insulator pushers 87 and actuator rods 88 are moved upwardly as in a manner described in the aforementioned application Ser. No. 101,638 to insert the insulators and coils into the core. Thereafter the stops 126 may be pivoted out of alignment with the core and the core removed from the insertion tooling. At this time the tooling is again ready to receive insulators and coils.

The first step in moving the tooling back to Station I is provided by energizing the cylinder 101 to retract the piston 103. This pivots the tooling from the position of FIG. 8 to the position of FIGS. 1 and 5. During this operation the stop 113 engages guide block mechanism 105 to provide a stable base from which the piston acts. Then, as previously described, to go from Station II to Station I hydraulic cylinder 118 is first energized to return the stops to their other positions and then hydraulic cylinder 100 is energized to extend piston 102.

The plates 108, 109, 110 and 111, the stops 112 and 113 and the guide block mechanisms 104 and 105 in addition to providing stable bases for the cylinders 100 and 101 in moving the insertion tooling between the stations also provide means for positively stopping the tooling at Station I with the slots 86 in alignment with corresponding slots of magazine 15 and at Station III with the head 83 positioned to receive a core 125. To provide a similar positive holding arrangement at Station II, so that the slots formed in the head 83 by the divider blade section 84 and coil turn feeder blades 85 are properly aligned to receive the turns of wire generated about the winding head 82, the side members 127 and 128 of the insulator and coil insertion tooling are provided with hydraulic cylinders 129. The distal end of the pistons 130 for these cylinders are tapered to a wedge shape to be received in a similarly shaped slot 131 provided in a plate 132. Each of the plates 132 is mounted on a horizontal beam 133 which forms part of the frame 11. Thus the pistons 130 and slots 131 assure a positive positioning of the insertion tooling when in Station II.

It will be understood that the apparatus just described provides a number of advantages. For instance, pivoting the coil and insulator tooling to swing through a vertical plane with the mechanisms at the various stations intersecting this plane and with the insertion tooling being disposed at an angle to the vertical when it is at at least one station (Stations I and III in the exemplification) provides a rugged yet compact apparatus. Also the tooling is properly aligned at each station and proven components can be utilized.

Turning now to FIG. 18 there is shown another head 134 which may be utilized as part of the insulation and coil insertion tooling 12 in place of head 83. The head 134 includes a plurality of insulator guides 135 forming insulator receiving slots 136 between each adjacent pair of insulator guides. Each of the insulator guides 135 mates with one of a plurality of spaced apart fingers or coil turn guides 137. Each adjacent pair of coil turn guides form a coil turn receiving slot or aperture 138 therebetween. Within the fingers 137 there is provided a turn pusher device in the form of a stripper head 139. The stripper head 139 may have fingers which extend into the coil receiving slots 138 to remove the turns for various coils from between the coil turn guides 137. The head 134 is particularly useful where it is desired to process motors having different numbers of poles as the coils for these different numbers of poles may be formed merely by utilizing different ones of the fingers 137 and where it is desired to provide different coils of different size wire, as in motors having start and run windings. Additional details of a particular coil and insulator-receiving head of this general construction which may be utilized in an apparatus of the present invention may be had by reference to U. S. Pat. No. 3,324,536, for instance.

Figure 20:
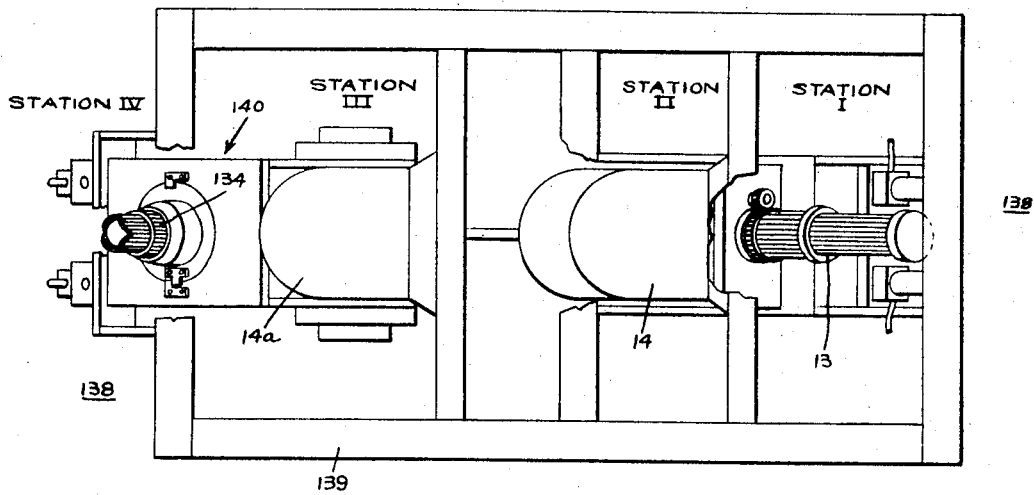
FIG. 20 is a plan view of another apparatus for forming shaped insulators, for developing coil turns into coil groups and for inserting insulators and coils into slots of a magnetic core according to the present invention, the view being schematic in form and with certain parts omitted for purposes of illustration.
Figure 21:
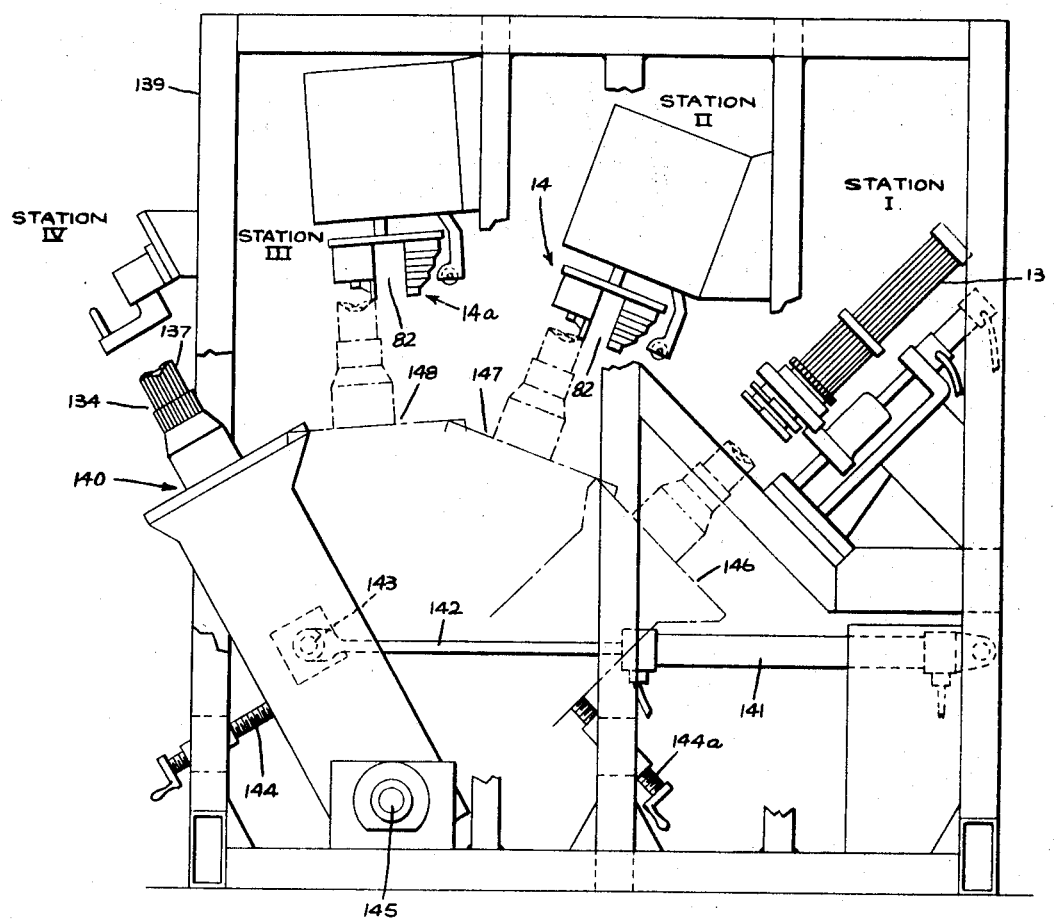
FIG. 21 is a somewhat schematic side elevational view of the apparatus of FIG. 20, illustrating the insulator and coil insertion tooling in various of its positions.

Turning now to FIGS. 20 and 21 there is provided apparatus for inserting insulators and coils of generated turns of electrically conductive wire in predetermined slots of a magnetic core similar to the apparatus of FIGS. 1-10 but particularly adapted to selectively insert coils of different size wire. To this end there is provided a frame 139 forming a Station I at which is mounted an insulator-forming means 13, a Station II at which is mounted a first turn-generating means 14, a Station III at which is mounted a second turn-generating means 14a, and a Station IV at which received insulators and turns are inserted from the insulator and coil insertion tooling 140 into a suitable magnetic core. The turn-generating means 14 and the turn-generating means 14a both may be the same type as turn-generating means 14 at Station II of FIG. 1 but both are provided so that it is not necessary to change the wire supply in order to generate turns of two different sizes of wire.

The tooling 140 is illustrated as including an insertion head 134 as such a tooling head is adapted for easily handling different sizes of wire. Additionally the insulator and coil inserting apparatus 138, by way of illustration, is modified from that shown in FIGS. 1–10 in that the insulator and coil inserting tooling 140 is moved between the various stations by means of a single hydraulic cylinder 141. The piston 142 of the cylinder 141 is pivotally attached to the tooling at 143. In FIG. 21 the tooling is shown at Station IV where it engages a large set screw or bolt 144 for positively positioning the tooling. As the hydraulic cylinder is actuated to retract the piston 142, the tooling 140 rotates or pivots about trunnions such as that shown at 145 so that it moves through a generally vertical plane which intersects the turn-generating means 14 and 14a and the insulator-forming means 13. When the tooling reaches its other extreme position as indicated by the dashed lines at 146, it engages a second adjustable set screw or bolt 144a which positively positions it with the fingers or guides 137 in alignment with the slots of the insulator magazine. The intermediate positions of the tooling 140 are illustrated by broken lines at 147 and 148 with the guides or fingers 137 in alignment with the winding head 82 of turn-generating means 14 and 14a respectively. Shot pin arrangements similar to cylinders 129, pistons 130 and plates 132 of the apparatus of FIG. 1 may be utilized for properly positioning the tooling at Stations II and III. However, these have not been shown for the sake of simplicity.

It will be understood that the apparatus, including the tooling, shown in FIGS. 20 and 21, is very flexible and advantageous when it is desired to form and insert the insulators and coils for a first phase and for a second phase either simultaneously or serially, particularly when different wire is used for each phase.

In one mode of operation this may be done by moving the tooling 140 first to Station I, at which previously formed insulators are placed in the head 134; then to Station II at which coils for a first phase are received in head 134; into Station IV, where the coils and insulators previously received in the head 134 at Stations I and II are inserted into a magnetic core which would then be removed from the head. Thereafter the tooling 140 would be pivoted back to Station I to receive additional insulators (if desired), then moved to Station III to receive additional coils of another wire (or moved to Station II if desired to receive coils of the same wire) then moved to Station IV where these insulators and coils are inserted into the magnetic core. Similarly the apparatus may be used to insert coils formed of two different wires simultaneously. In such a mode of operation the tooling 140 would first be moved to Station I, if desired, to receive appropriate insulators; then moved to Station II to receive turns of wire for a first set of coils formed from one wire (such as one size or type); then moved to Station III, where turns of another wire are generated and received in the tooling for a second set of coils; and then moved to Station IV where the insulators and all of the coils are inserted into the magnetic core. It will be understood that if desired two sets of coil and insulator inserting tooling could be used, offset from one another. With such an arrangement the insulators and coils could be received in one insertion tooling while previously received coils and insulators were being inserted from the other tooling into a magnetic core.

Figure 19:
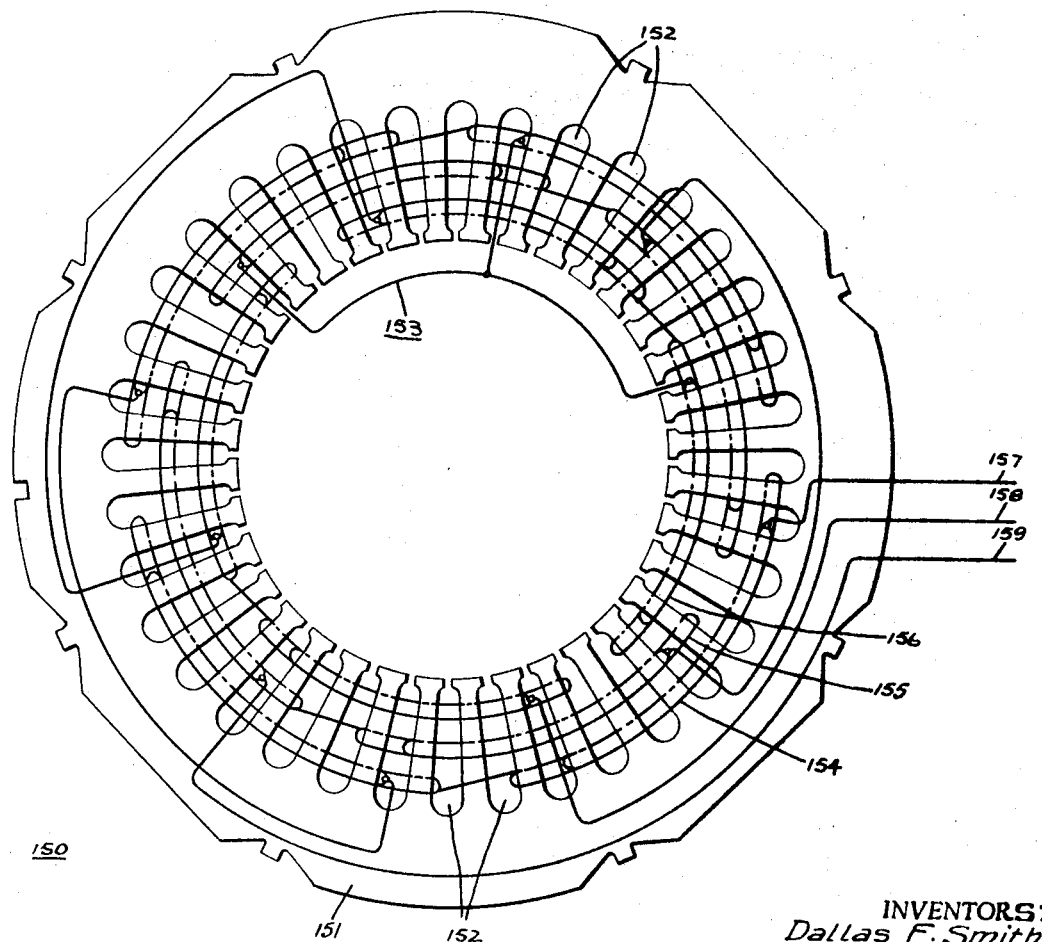
FIG. 19 is a somewhat schematic end view of a four pole, 3 phase induction electric motor stator which may be manufactured using the tooling of FIG. 18.

Referring now to FIG. 19, by way of example, there is illustrated, in schematic form a polyphase induction stator, including a winding which may advantageously be formed using the apparatus illustrated in FIGS. 20 and 21. The stator 150 includes a core 151 defining thirty-size equally spaced slots 152. A winding 153, including three phases 154, 155 and 156, is received in the slots 152 and is adapted to be connected to a source of three phase alternating current power through conductors 157, 158 and 159. It will be seen from FIG. 19 that the phase windings are arranged to provide four equal poles. Additional details of this illustrative stator may be had by reference to U. S. Pat. No. 2,796,543, issued to G. B. Dunn, Jr. and assigned to General Electric Company, assignee of the present invention.

It will be understood that while we have described what at present is considered to be the preferred embodiments of the present invention it will be apparent that various modifications may be made without departing from the invention. It is therefore intended in the appended claims to cover all such changes and modifications as fall within the true spirit and scope of our invention.

What we claim as new and desire to secure by Letters Patent of the United States is:

1. Apparatus for inserting insulators and coils of generated turns of electrically conductive wire into predetermined slots of a magnetic core having a longitudinal axis, including:
   a. insulator and coil insertion tooling adapted to receive insulators and coils therein and subsequently effect insertion of the received insulators and coils into predetermined slots of a magnetic core, said tooling having a longitudinal axis which is generally parallel with the longitudinal axis of the core when said tooling is effecting insertion of insulators and coils into the core;
   b. a first station including means for forming insulators in a predetermined pattern;
   c. a second station including means for generating turns of electrically conductive wire;
   d. a third station at which insulators and coils previously received in said insertion tooling are inserted into the magnetic core;
   e. means for moving said insulator and coil insertion tooling serially between said first, said second and said third stations and for positioning said insulator and coil insertion tooling at said stations to receive formed insulators and generated turns of wire and then to insert the insulators and generated turns of wire into predetermined slots of a magnetic core;
   f. the longitudinal axis of said insulator and coil insertion tooling being non-vertically disposed when the tooling is positioned at at least one of said first, second and third stations.

2. Apparatus for inserting insulators and coils of generated turns of electrically conductive wire into a predetermined slots of a magnetic core, including:
   a. insulator and coil insertion tooling adapted to receive insulators and coils therein and subsequently effect insertion of the received insulators and coils into predetermined slots of a magnetic core;
   b. a first station including means for forming insulators in a predetermined pattern;

c. a second station including means for generating turns of electrically conductive wire;

d. a third station at which insulators and coils previously received in said insertion tooling are inserted into the magnetic core;

e. means for moving said insulator and coil insertion tooling serially between said first, said second and said third stations to receive formed insulators and generated turns of wire and then to insert the insulators and generated turns of wire into predetermined slots of a magnetic core; and f. means to pivot said insertion tooling about a horizontal axis for moving said insertion tooling between said first, second and third stations; said insulator and coil insertion tooling being disposed at an angle relative to the vertical when it is positioned at at least one of said first, second and third stations.

3. Apparatus as set forth in claim 1; wherein said means for moving said insulator and coil insertion tooling swings said insertion tooling along a path lying in a generally vertical plane; and said first, second and third stations are located along such path.

4. Apparatus as set forth in claim 1 wherein said insertion tooling includes means defining angularly spaced apart slots for receiving generated turns of wire to develop a plurality of coil groups in said insertion tooling; said apparatus further including means for rotating said slot defining means to dispose different predetermined slots in alignment with said turn-generating means.

5. Apparatus for inserting, into predetermined slots of a magnetic core, coils of generated turns of electrically conductive wire forming at least two electric phases; said apparatus including:

a. coil insertion tooling adapted to receive coils therein and subsequently effect insertion of the received coils into predetermined slots of a magnetic core;

b. winding means for generating turns of electrically conductive wire;

c. said winding means and said coil insertion tooling being positioned in alignment during the generation of turns of wire so that at least some previously generated turns are received in said insertion tooling as subsequent turns are generated;

d. means for rotating said coil insertion tooling so that the turns of generated wire forming each electric phase are received in said coil insertion tooling angularly displaced from any other phase;

e. an insertion station at which the coils forming the at least two electric phases previously received in said coil insertion tooling are substantially simultaneously inserted into the magnetic core; and f. means for moving said coil insertion tooling between said winding means and said insertion station by swinging said coil insertion tooling along a path lying in a generally vertical plane between said insertion station and said winding means.

6. Apparatus as set forth in claim 5 wherein said winding means includes a different winding head mechanism for generating the turns of wire for each of the phases and further including means for providing relative movement between said coil insertion tooling and said winding heads.

7. Apparatus for inserting into predetermined slots of a magnetic core having a longitudinal axis, insulators and coils of generated turns of electrically conductive wire with the coils forming at least two electrically conductive wire with the coils forming at least two electric phases; said apparatus including:

a. insulator and coil insertion tooling adapted to receive insulators and coils therein and subsequently effect insertion of the received insulators into predetermined slots of a magnetic core, said tooling having a longitudinal axis which is generally parallel with the longitudinal axis of the core when said tooling is effecting insertion of insulators and coils into the core;

b. insulator making means for forming insulator in at least a predetermined pattern c. winding means for generating turns of electrically conductive wire;

d. an insertion station at which the insulators and coils previously received in said insertion tooling are inserted into the magnetic core;

e. means for moving said insertion tooling serially between said insulator making means, said winding means and said insertion station and for positioning said insulator and coil insertion tooling to receive formed insulators and generated turns of wire into predetermined slots of a magnetic core;

f. the longitudinal axis of said insertion tooling being non-vertically disposed when the tooling is positioned at one of said insulator making means, said winding means and said insertion station; and g. means for rotating said insertion tooling so that generated turns of wire forming coils of each phase are inserted in the magnetic core in proper angular relationship to the turns of wire forming coils of any other phase.

8. Apparatus as set forth in claim 7 wherein said winding means includes a different winding head mechanism for generating the turns of wire for each of the phases; said apparatus further including means for providing relative movement between said injection tooling and said winding heads.

9. Apparatus as set forth in claim 8 wherein said means for moving said insertion tooling swings said insertion tooling along a path lying in a generally vertical plane; and said insulator making means, each of said winding heads and said insertion station are all located along such path.

10. Apparatus as set forth in claim 1 wherein said means for forming insulators includes:

a. an insulator-receiving mechanism having slots corresponding to the slots of the slotted magnetic core;

b. severing means operable to cyclically sever a length from the strip of insulative material and introduce the severed length into a slot of said insulator-receiving mechanism;

c. drive means for moving said insulator-receiving mechanism to bring said slots of said insulator-receiving mechanism sequentially in alignment with said severing means;

d. at least first and second control mechanisms, each of said control mechanisms being effective when operative to repeatedly halt said insulator-receiving mechanism with a corresponding series of insulator-receiving slots in alignment with said severing means, the series of insulator-receiving mechanism slots related to at least one of said control mechanism being different than the series of insulator receiver mechanism slots related to the other of said control mechanisms; and e. selector means effective to determined which of said at least first and second control mechanisms is operative at any given time.

11. A method of inserting insulators and coils of electrically conductive wire into predetermined slots of a magnetic core; comprising the steps of: positioning insulator and coil insertion tooling at a first station; receiving insulators in predetermined apertures of the tooling while the tooling is at the first station; swinging the insulator and coil insertion tooling along a path lying in a generally vertical plane to a second station; receiving generated turns of wire in predetermined apertures of the tooling to form coils while the tooling is at the second station; swinging the insulator and coil insertion tooling along a path lying in a generally vertical plane to a third station and inserting the insulators and coils into the predetermined slots of the magnetic core while the tooling is at the third station.

12. A method of inserting into predetermined slots of a magnetic core coils of generated turns of electrically conductive wire with the coils forming at least two electric phases; comprising the steps of: positioning coil injection tooling at a winding station; generating turns of wire and receiving the generated turns in predetermined apertures of coil insertion tooling to complete the development of all the coils of the phases while the tooling is at a winding station, with at least some of the turns being received in the injection tooling as other turns are generated; swinging the insertion tooling along a path lying in a generally vertical plane to an insertion station; and substantially simultaneously inserting all of the developed coils into the predetermined slots of the magnetic core while the tooling is at the insertion station.

13. The method of claim 12 further comprising the steps of receiving insulators in predetermined apertures of the insertion tooling and then inserting the insulators into predetermined slots of the magnetic core in conjunction with insertion of the coils.

14. A method of inserting into predetermined slots of a magnetic core insulators and coils of generated turns of electrically conductive wire with the coils forming at least two electric phases; comprising the step of: receiving insulators into predetermined apertures of the coil and insulator insertion tooling to form at least two electrical poles at a winding station; swinging the coil and insulator insertion tooling along a path lying in a generally vertical plane to an insertion station; and substantially simultaneously inserting the received insulators and turns of electrically conductive wire from the insulator and coil insertion tooling into predetermined slots of the magnetic core while the tooling is at the insertion station.

15. The method of claim 14 wherein the steps of receiving generated turns of wire, forming at least two electrical poles, in predetermined apertures of the insulator and coil insertion tooling and inserting the turns of electrically conductive wire from the insulator and coil insertion tooling into predetermined slots of the magnetic core are performed at least twice for each core.

16. A method of inserting coils of electrically conductive wire into predetermined slots of a magnetic core; comprising the steps of: generating turns of a first electrically conductive wire; receiving the turns of the first wire in predetermined apertures of coil insertion tooling to form coils for a first electric phase; generating turns of at least a second electrically conductive wire; receiving the turns of the at least second wire in predetermined apertures of the coil insertion tooling to form coils for at least a second electric phase; swinging the coil insertion tooling with the wire coils thereon along an arcuate path lying in a generally vertical plane to an insertion station; and inserting the received coils into predetermined slots of the magnetic core while the tooling is at the insertion station.

17. The method of claim 16 wherein: the coils for the first phase are inserted into predetermined slots of the magnetic core before the turns forming the coils for the at least second phase are received in predetermined apertures of the coil insertion tooling.

18. The method of claim 16 wherein: the coils for the first electric phase and the coils for the at least second phase are substantially simultaneously inserted into predetermined slots of the magnetic core.

19. The method of claim 16 wherein: insulators are received in predetermined apertures of the coil insertion tooling; and the received insulators are inserted into predetermined slots of the magnetic core substantially simultaneously with the coils for at least one of the electric phases.

* * * * *